(12) United States Patent
Shumaker

(10) Patent No.: US 12,552,324 B2
(45) Date of Patent: Feb. 17, 2026

(54) INSTANT RELEASE COUPLER WITH UNIVERSAL MOUNT FOR VEHICLE ATTACHMENTS USING A RIGID SUPPORT

(71) Applicant: Kristopher D. Shumaker, Upland, IN (US)

(72) Inventor: Kristopher D. Shumaker, Upland, IN (US)

( * ) Notice: Subject to any disclaimer, the term of this patent is extended or adjusted under 35 U.S.C. 154(b) by 37 days.

(21) Appl. No.: 18/657,647

(22) Filed: May 7, 2024

(65) Prior Publication Data

US 2024/0326704 A1    Oct. 3, 2024

(51) Int. Cl.
*B60R 9/06* (2006.01)
(52) U.S. Cl.
CPC ...................... *B60R 9/06* (2013.01)
(58) Field of Classification Search
CPC ........ B60R 9/06; B60R 9/10; B60D 2001/003
See application file for complete search history.

(56) References Cited

U.S. PATENT DOCUMENTS

| | | | | |
|---|---|---|---|---|
| 4,581,908 A * | 4/1986 | Bulle | ...................... | B60D 1/60 280/507 |
| 5,121,862 A * | 6/1992 | Schmidt | ................... | B60R 9/10 224/520 |
| 5,195,339 A * | 3/1993 | Nee | ......................... | B60D 1/60 70/58 |
| 5,330,139 A | 7/1994 | Tietje | | |
| 5,489,110 A * | 2/1996 | Van Dusen | ............... | B60R 9/06 224/532 |
| 5,615,904 A * | 4/1997 | Van Dusen | ............. | B60D 1/52 280/491.5 |
| 5,685,469 A * | 11/1997 | Stapleton | .................. | B60R 9/10 224/536 |
| 5,769,559 A * | 6/1998 | Olson | ...................... | B60D 1/02 280/509 |
| 5,921,699 A * | 7/1999 | Olson | ...................... | B60D 1/28 280/509 |
| 7,300,068 B1 * | 11/2007 | Johnsen | ................... | B60D 1/60 280/507 |
| 8,308,185 B2 * | 11/2012 | Weaver | .................. | B60D 1/025 280/506 |
| 8,444,169 B1 * | 5/2013 | Katz | ........................ | B60D 1/62 280/504 |
| 9,358,850 B1 * | 6/2016 | Bale | ........................ | B60D 1/06 |
| 10,046,712 B1 * | 8/2018 | Foley | ........................ | B60R 9/06 |
| 10,343,469 B2 * | 7/2019 | Faust | ....................... | B60D 1/28 |
| 10,609,874 B1 * | 4/2020 | Shumaker | ............. | A01G 20/43 |
| 10,654,328 B2 * | 5/2020 | Rametta | .................... | B60D 1/06 |
| 11,643,021 B2 * | 5/2023 | Kuschmeader | ........... | B60R 9/10 280/477 |

(Continued)

FOREIGN PATENT DOCUMENTS

CA    2639735 A1 *    3/2010    ............. B60D 1/065

*Primary Examiner* — William L Miller
(74) *Attorney, Agent, or Firm* — Frank M. Scutch, III

(57) ABSTRACT

An instant release coupler with universal mount for vehicle attachments includes a handle and trigger for releasing an adapter that fits within the coupler. The coupler is configured with a base that engages with an adapter such that the trigger releases a latch for holding the adapter to the base. The release coupler is used to easily transport and release large and/or bulky items typically at the rear of a van or automobile.

16 Claims, 12 Drawing Sheets

(56) References Cited

U.S. PATENT DOCUMENTS

| | | | | |
|---|---|---|---|---|
| 11,752,817 | B2* | 9/2023 | Robinson | B60D 1/28 |
| | | | | 280/491.5 |
| 11,865,880 | B1* | 1/2024 | Hartley | B60D 1/60 |
| 11,958,323 | B2* | 4/2024 | Garcia | B60D 1/065 |
| 2012/0032416 | A1* | 2/2012 | Frantz | B60D 1/06 |
| | | | | 280/507 |
| 2015/0208832 | A1* | 7/2015 | Kurniawan | A47F 7/00 |
| | | | | 248/671 |
| 2015/0258866 | A1* | 9/2015 | Frantz | B60D 1/60 |
| | | | | 280/507 |
| 2016/0214449 | A1* | 7/2016 | Dahlenburg | B60D 1/06 |
| 2017/0313145 | A1* | 11/2017 | McDougal | B60D 1/60 |
| 2019/0054782 | A1* | 2/2019 | Lasater | B60D 1/62 |
| 2020/0191167 | A1* | 6/2020 | Stoddard | A01G 20/47 |
| 2021/0061033 | A1* | 3/2021 | Robinson | B60D 1/075 |
| 2022/0266762 | A1* | 8/2022 | Bowe | B60R 9/10 |
| 2023/0139691 | A1* | 5/2023 | Garcia | B60D 1/46 |
| | | | | 280/477 |
| 2024/0059110 | A1* | 2/2024 | Mills | B60D 1/58 |
| 2024/0424842 | A1* | 12/2024 | Houser | B60R 9/10 |

* cited by examiner

INSTANT RELEASE COUPLER WITH UNIVERSAL MOUNT FOR VEHICLE ATTACHMENTS USING A RIGID SUPPORT

FIELD OF THE INVENTION

The present invention relates generally to a vehicular trailer hitch that also provides mounting support for various attachments and accessories using storage racks, stands and brackets.

BACKGROUND

Carrying heavy articles using a car or truck can be difficult as these items are burdensome to load and unload from the vehicle. For example, transporting a bicycle for use in "cycling" is a very popular activity. Many cyclists often transport their bicycle to locations that makes riding more enjoyable. When transporting the bicycle, a bicycle rack is often used to attach one or more bicycles to the vehicle. The bicycle rack can be attached to the top of the vehicle or to the bumper at the rear of the vehicle.

One problem associated with carriers like bicycle racks at the rear of the vehicle is the burden or attaching the rack to the vehicle. In some cases, the rack is installed onto the bumper, trunk, rear hatch, or trailer hitch. This type of arrangement makes it difficult to conveniently remove the rack from the vehicle as needed. Accordingly, new solutions are needed to connect and disconnect bulky objects quickly such as racks and other tool accessories to and from the vehicle.

BRIEF DESCRIPTION OF THE FIGURES

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

FIG. 3A is a top view of the release coupler.

Figure 1A:
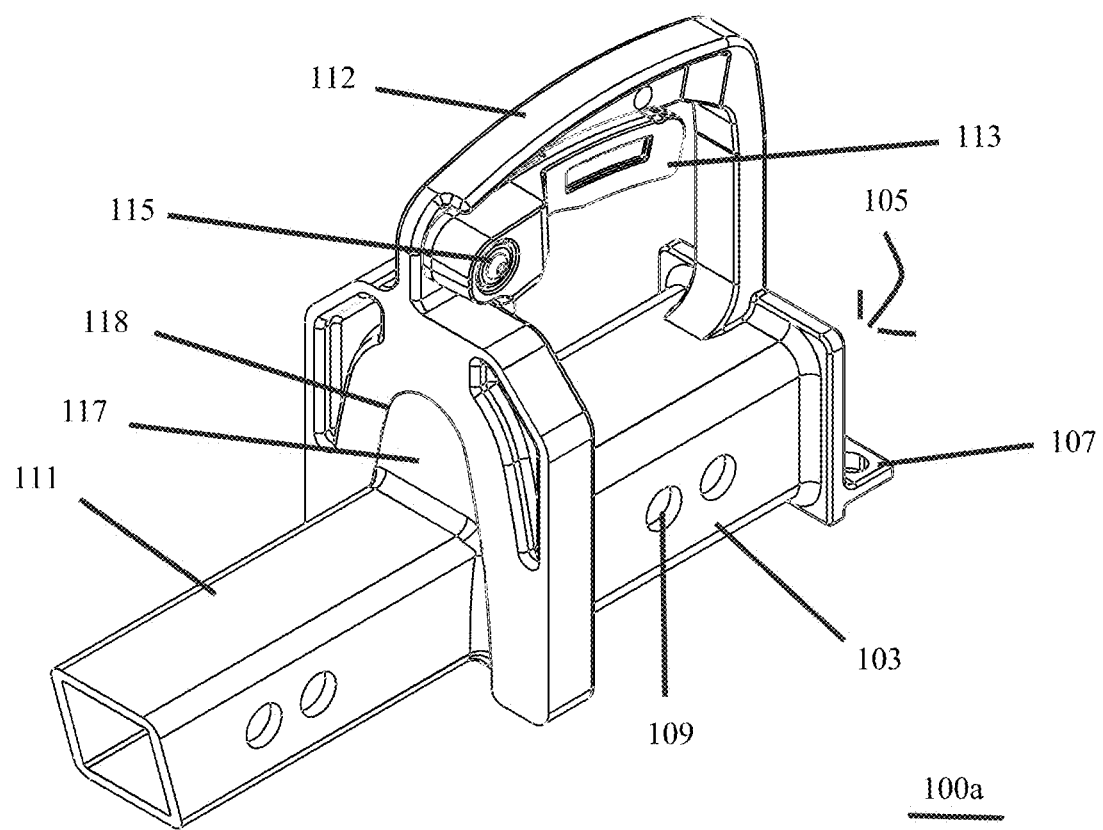
FIG. 1A is a first perspective view of the release coupler according to an embodiment of the invention

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail embodiments that are in accordance with the present invention, it should be observed that the embodiments reside primarily in combinations of method steps and apparatus components related to an automotive hitch assembly namely a release coupler for conveniently transporting both heavy and/or bulky articles on a vehicle. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

Figure 1B:
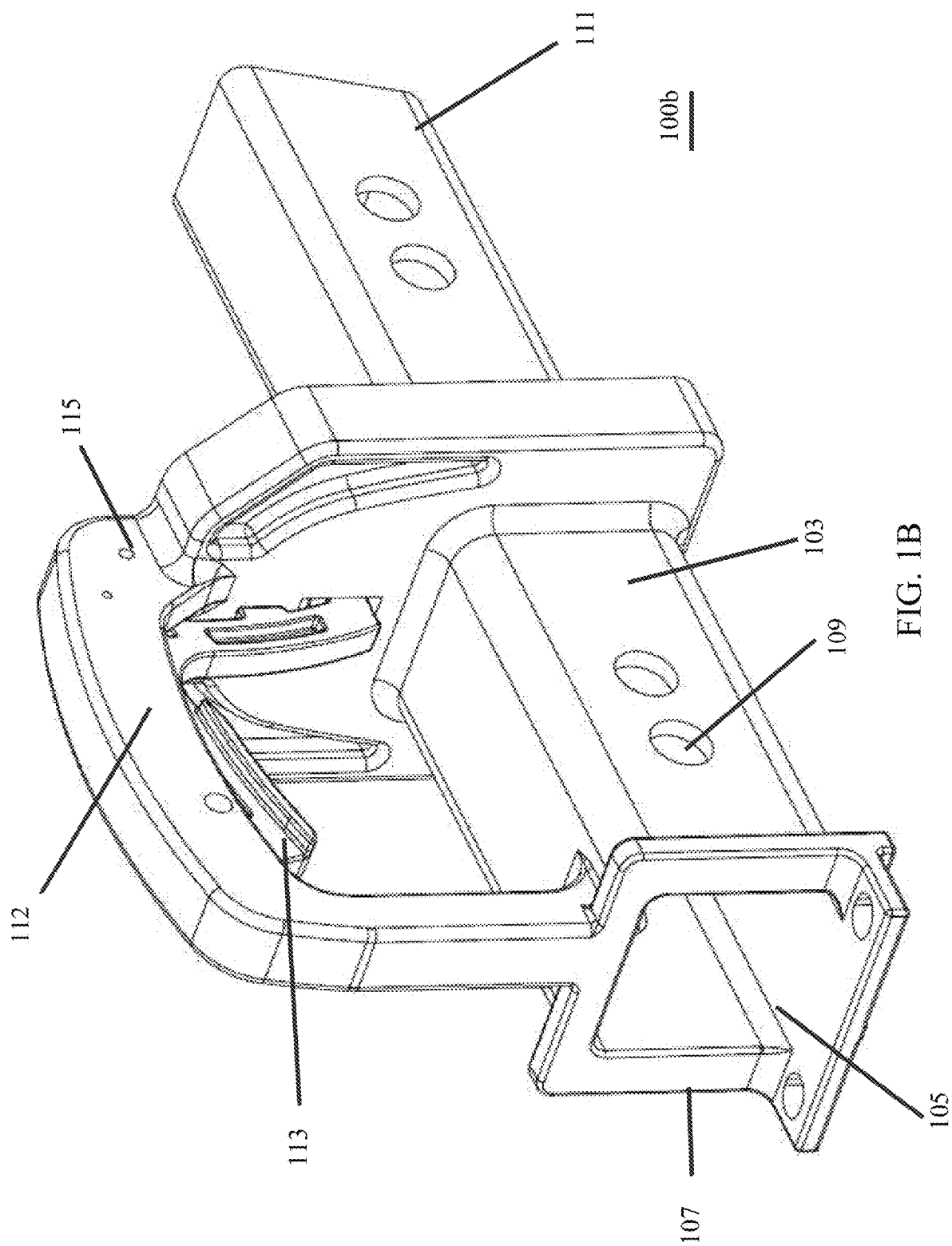
FIG. 1B is a second perspective view of the release coupler shown in FIG. 1A.

FIG. 1A is a first perspective view of the automotive type hitch assembly namely a release coupler with universal mount according to an embodiment of the invention. Similarly, FIG. 1B is a second perspective view of the release coupler shown in FIG. 1A. With regard to both FIG. 1A and FIG. 1B, the release coupler 100a, 100b, includes a base 103 formed substantially using a square-like member having an open end 105 such that a support bracket 107 surrounds its open end 105. Although the base 103 refers to the central section, other analogous terms such as "center" or "mount" also accurately reflect function of the base 103. In some embodiments the base 103 might be a solid tube either square or round. In the preferred embodiment, one or more apertures or viewing ports 109 are used for viewing an extension tube (not shown) that may be inserted into the open end 105.

As seen in both FIG. 1A and FIG. 1B, an adapter 111 incudes a male member 117 that is shown engaged with the release coupler assembly 100a, 100b. During transport, the adaptor 111 is connected to the hitch receiver while other various equipment such as a bicycle rack uses an extension tube that connects within or up to the open end 105. The extension tube may be in the form of a tubular member or the like. In use, the adapter 111 is typically inserted within an automotive hitch mounted at the rear of a vehicle. As described herein, a handle 112, with a trigger 113 pivots about point 115 and works to disengage the adapter 111, allowing any equipment or cargo to be easily disengaged from the vehicle.

Figure 1C:
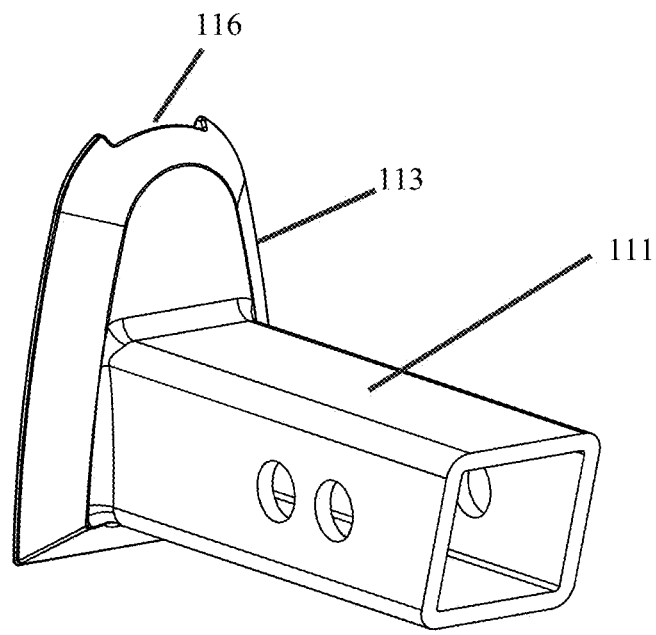
FIG. 1C and FIG. 1D are a perspective views showing the release coupler disengaged from the base.
Figure 1D:
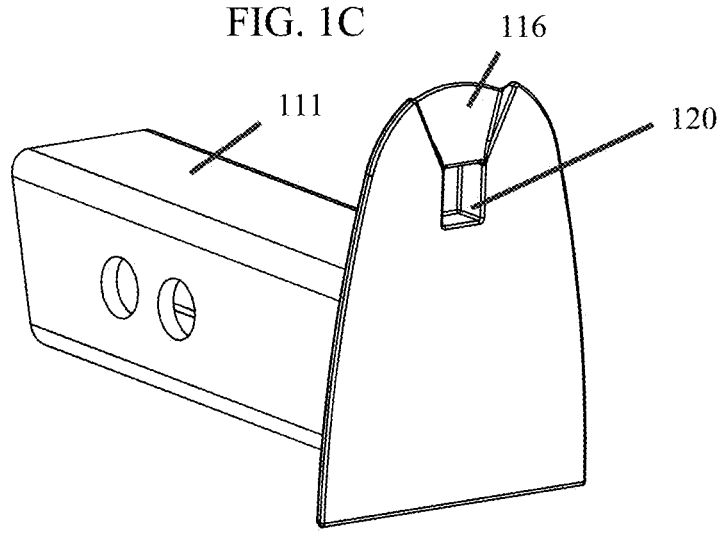

FIG. 1C and FIG. 1D are a perspective views showing the adapter 111 disengaged from the base. The adapter 111 includes a male member 114 having a blunt rounded top edge that includes an engagement notch 116. As seen in FIG. 1A, the male member 114 engages within the release coupler using a female cavity 118 configured at the coupler side of the base. As described herein, the latch boss engages within a square hollow 120 located within the male member 113 to hold it firmly into position within cavity 118.

Figure 2:
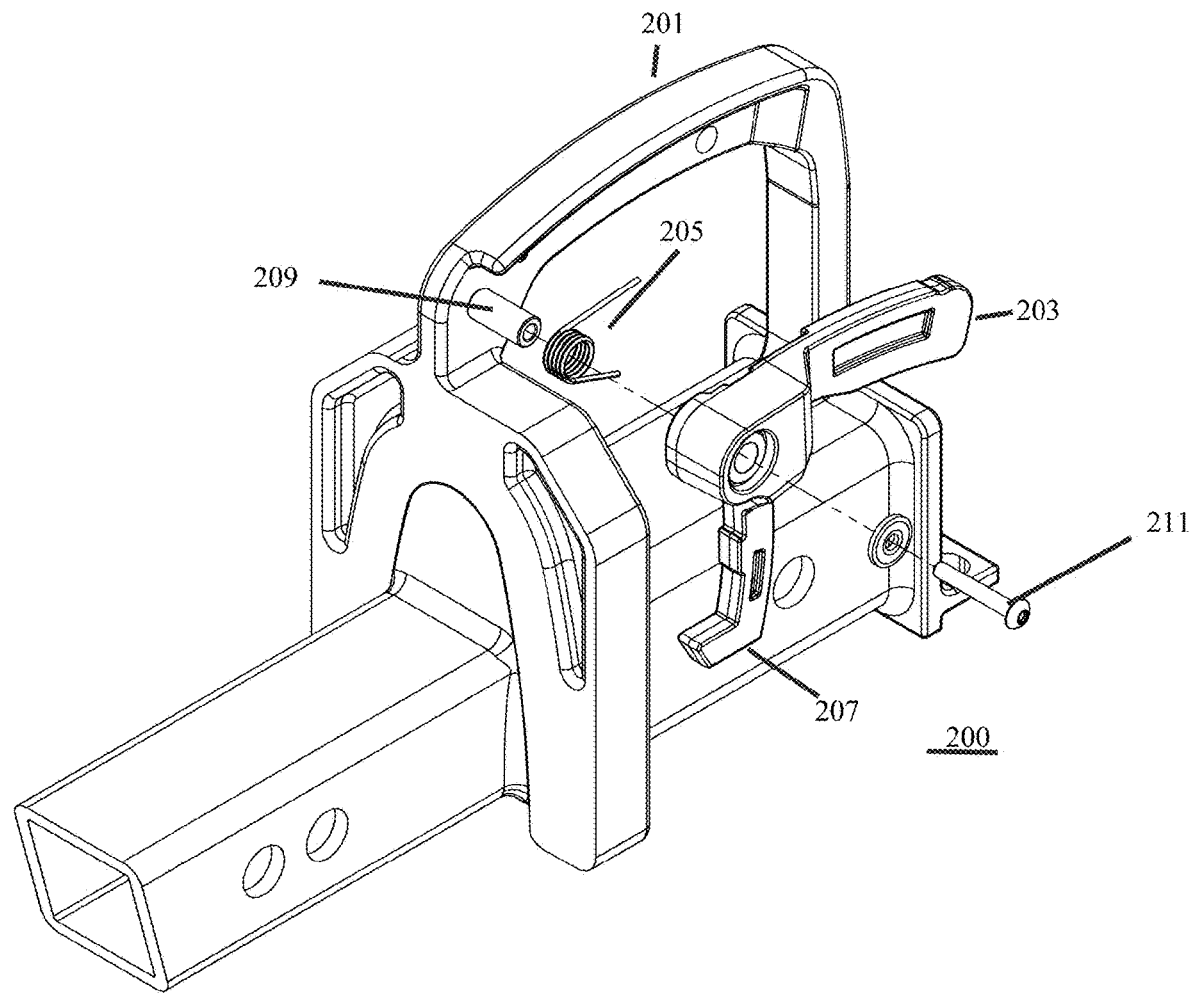
FIG. 2 is a partially exploded view of the release coupler showing the trigger assembly.

FIG. 2 is a partially exploded view of the release coupler assembly illustrating operation of the trigger assembly. The automotive hitch assembly 200 is illustrated where a carry handle 201 guards a trigger 203 that is configured within the underside of the handle 201. The trigger 203 pivots substantially at one end and uses a spring 205 to provide resilience to operate a latch boss 207. The trigger 203 mounts to and pivots about stud 209 using fasteners 211. In use, the latch boss 207 slidably connects with the top of the male member, and engages within the square hollow to hold the male member while engaged into a fixed position within the cavity 118.

Figure 3B:
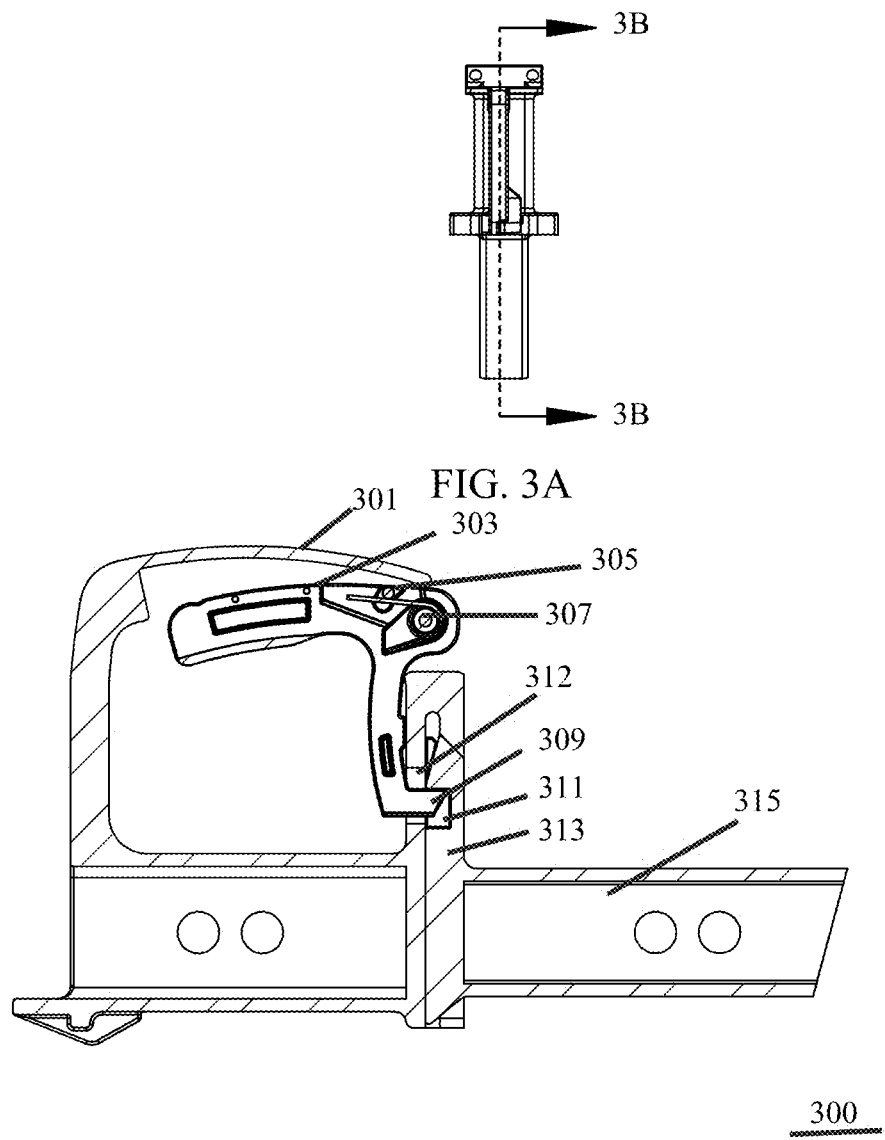
FIG. 3B is sectional view though lines 3B-3B of FIG. 3A showing operation of the trigger assembly.
Figure 4A:
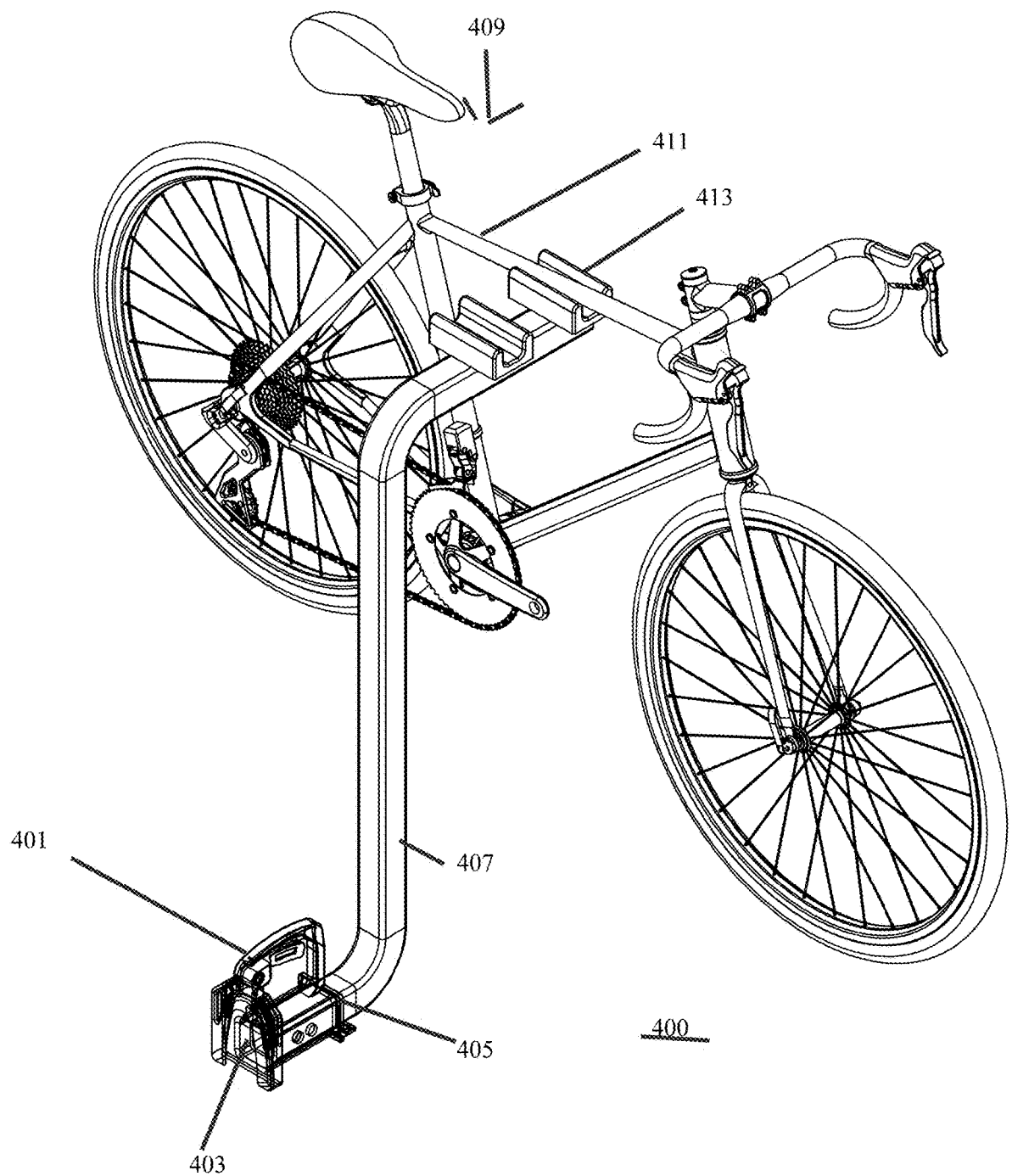
FIG. 4A, FIG. 4B, FIG. 4C, FIG. 4D, FIG. 4E and FIG. 4F illustrate an application of the release coupler using a bicycle.
Figure 4B:
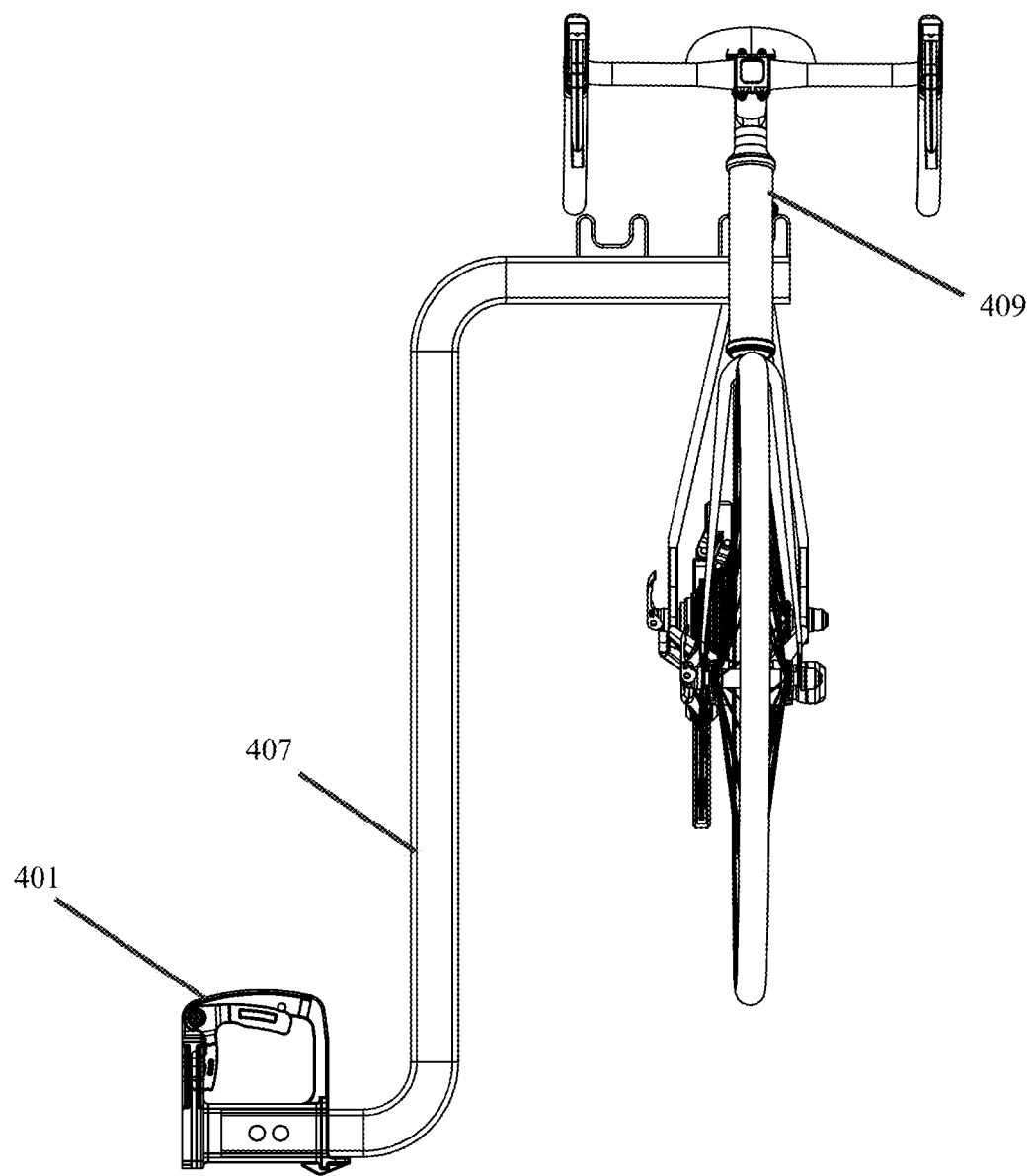
Figures 4C, 4D:
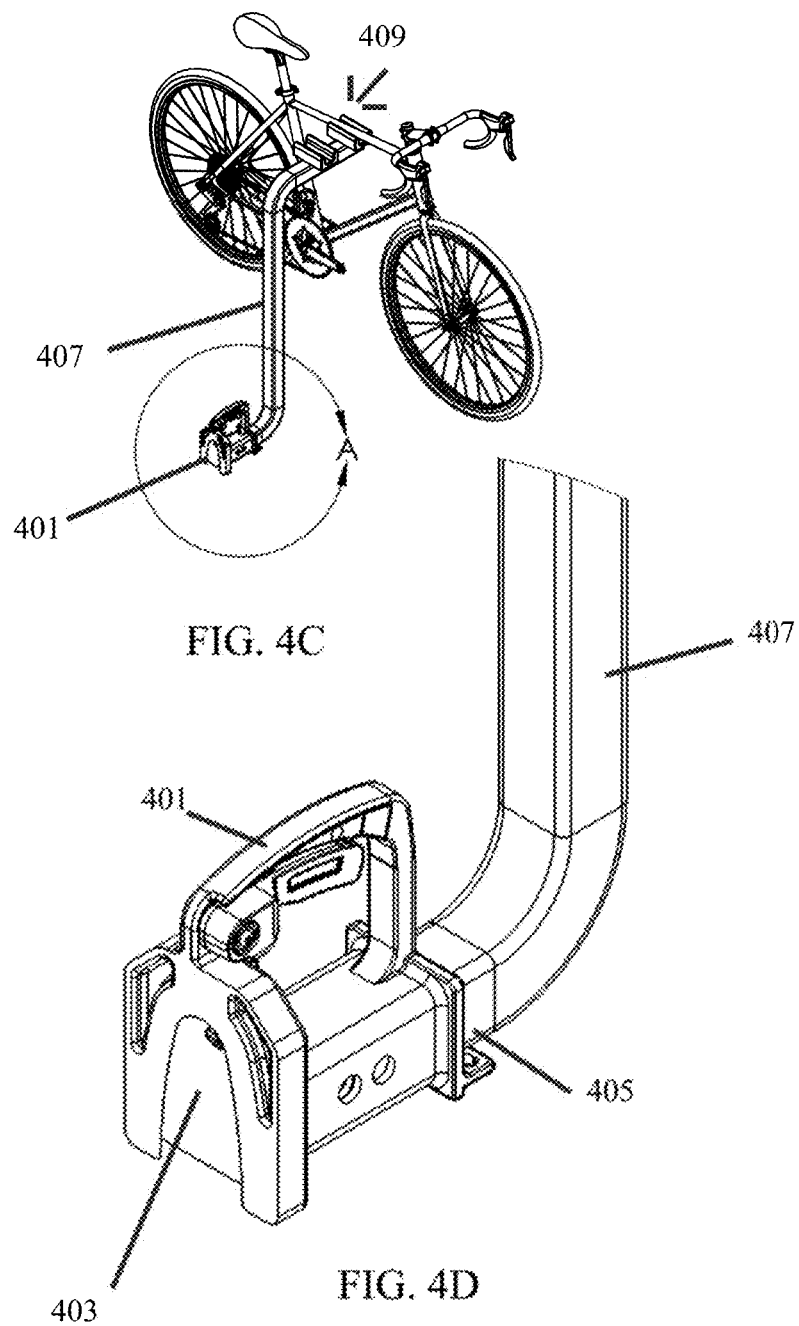
Figure 4E:
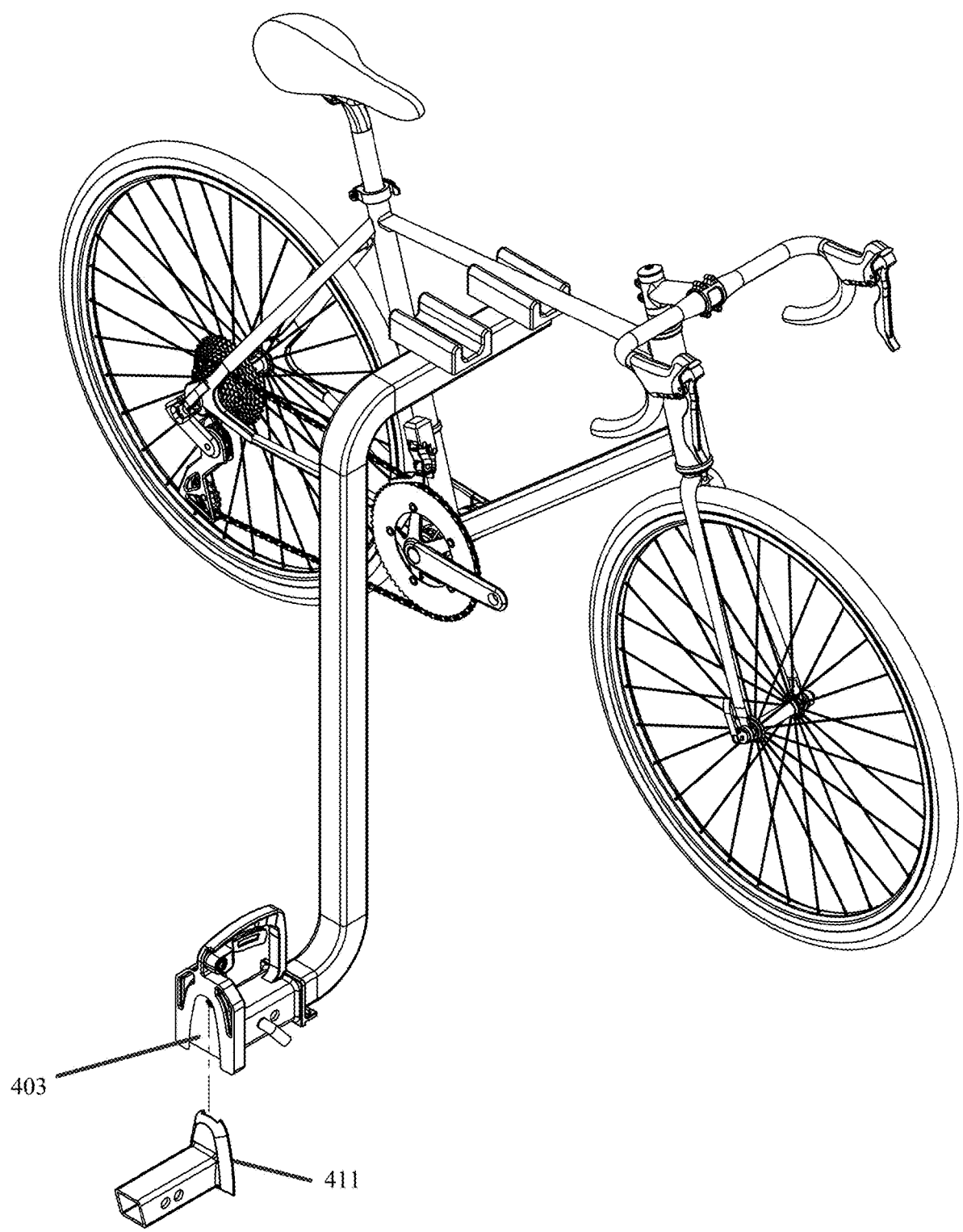
Figure 4F:
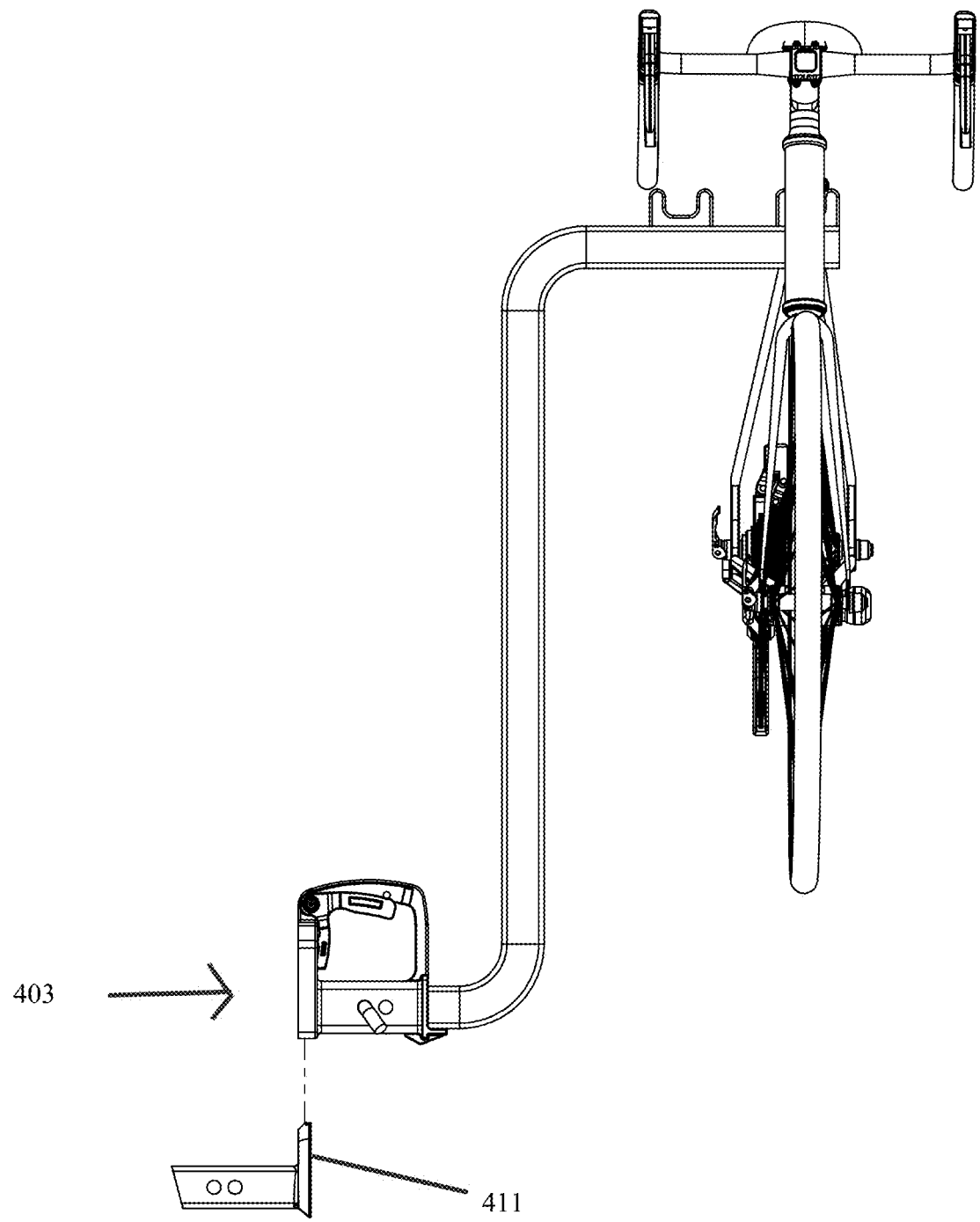

FIG. 3A and FIG. 3B are sectional views though lines 3B-3B showing operation of the trigger assembly. The sectional view shown in FIG. 3B illustrates the release coupler assembly 300 where the handle 301 is shown with a trigger 303 configured underneath. A spring 305 provides resilience for the trigger 303 allowing it to pivot about stud 307. The trigger 303 is substantially L-shaped and includes a latch boss 309 connected to trigger 303 at one end. The latch boss 309 works to engage within a square hollow located in an adapter 315. In use, the latch boss 309 holds the male member 313 within the cavity 312 so the release coupler remains in a fixed and rigid position. To disengage the release coupler from the male member, pulling and/or actuating the trigger 303 moves the latch boss 309 in an outward motion so that it is released from the square hollow. This allows the release coupler to upwardly slide within its cavity releasing the male member 313 from the adapter 315.

FIG. 4A, FIG. 4B, FIG. 4C, FIG. 4D, FIG. 4E and FIG. 4F illustrate an application of the release coupler and universal mount using a bicycle. Although a bicycle is used in this illustration, those skilled in the art will recognize that any type of heavy equipment in need in transport can be used. With regard to FIGS. 4A to 4F, the release coupler and universal mount assembly 400 is shown where the release coupler 401 would typically connect with an adapter at end 401 and with a extension tube at end 403. In this configuration, an extension tube 407 connects with the release coupler 401 at area 405 and is bent to support a bicycle 409. The frame member 411 is supported by a bracket 413 which connects to the end of extension tube 407.

Figure 5:
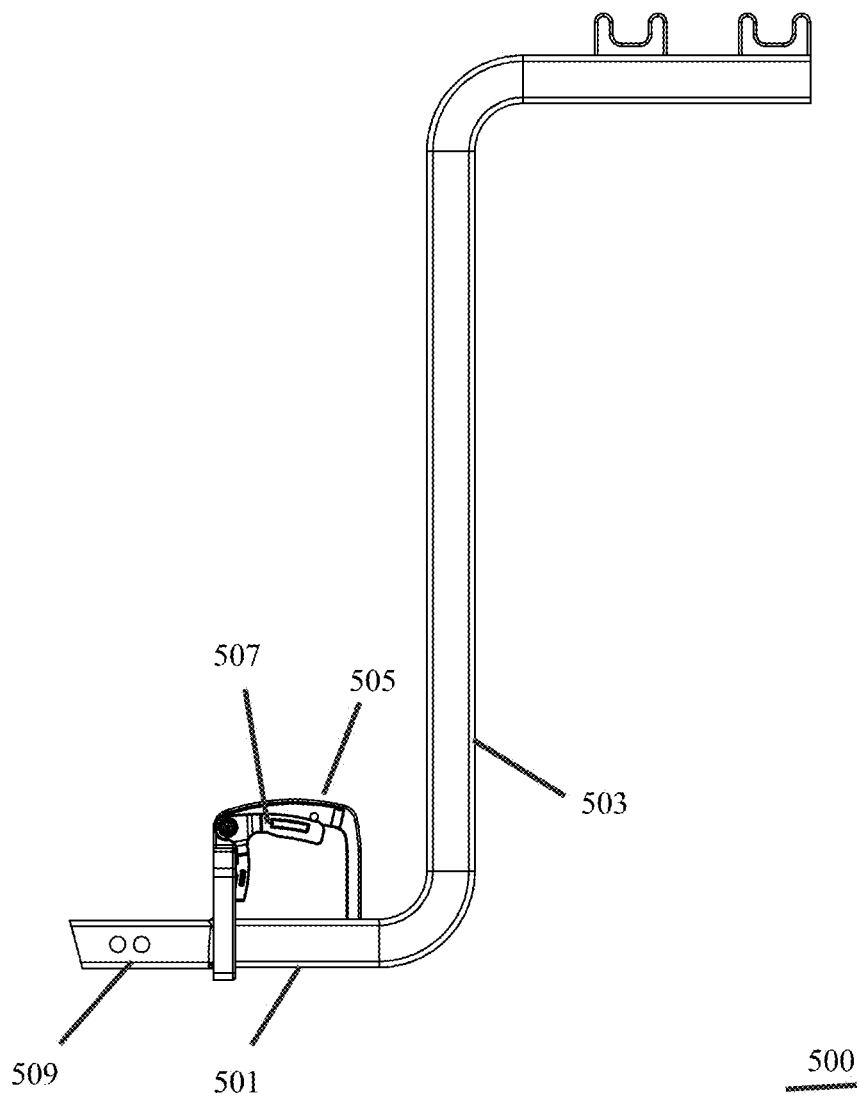
FIG. 5 illustrates an alternative embodiment of the invention where the extension tube and release coupler form one unity body

FIG. 5 illustrates an alternative embodiment of the invention where the extension tube and release coupler form one unity body. More specifically, the release coupler 500 includes a base 501 and an extension tube 503. In this embodiment, the extension tube 503 is welded and/or otherwise permanently attached to the base 501 so it forms one unity assembly. Like the embodiment shown in FIG. 1, a handle 505 and trigger 507 work with a latch so it can be connected and/or disconnected from an adapter that connects with the first end 509. As described herein, the adapter connects with the hitch of a vehicle.

Figure 6:
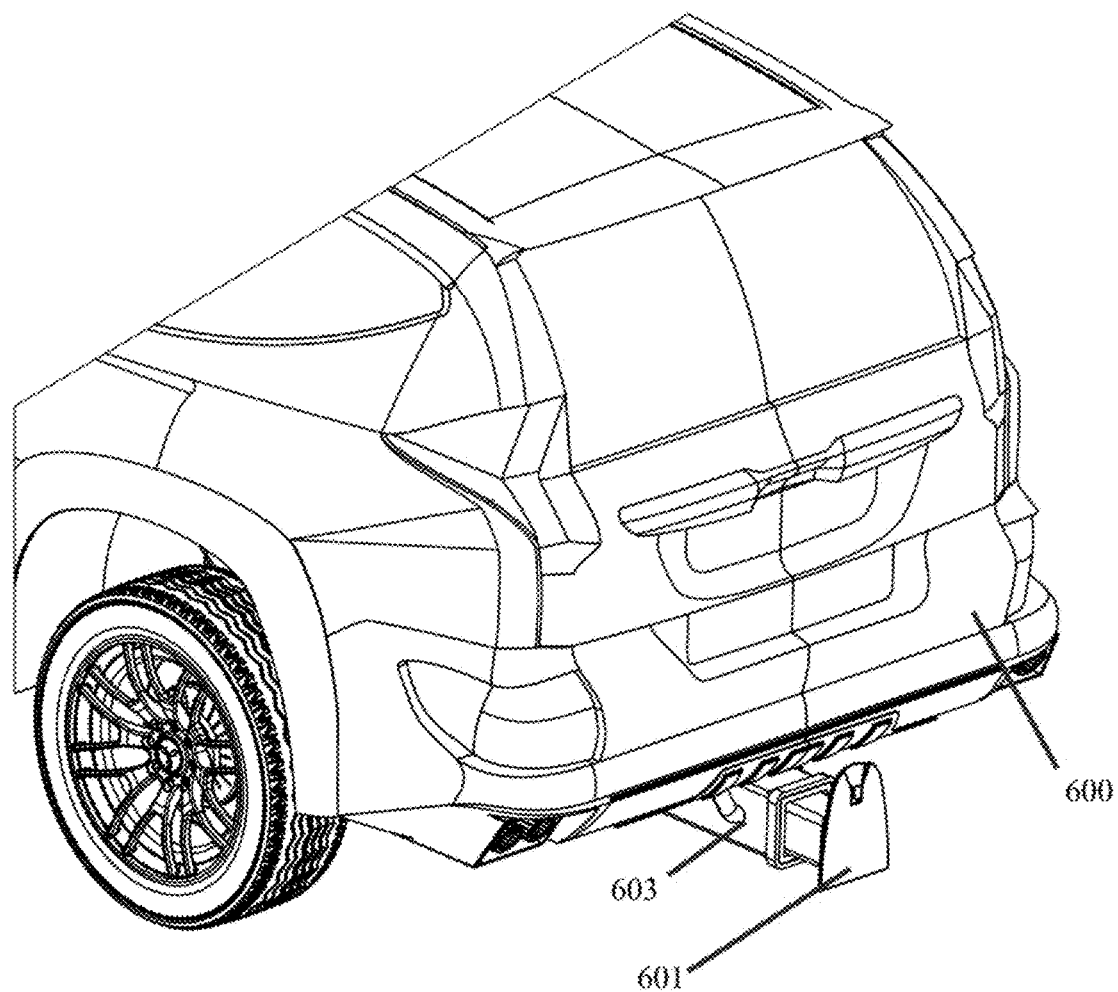
FIG. 6 illustrates release coupler mounted at the rear of a vehicle.

FIG. 6 illustrates an adapter mounted at the rear of a vehicle. More specifically, the vehicle 600 is shown where an adapter 601 is mounted within the vehicle hitch 603. In use, the adapter 601 can be easily engaged with a release coupler allowing large implements e.g. bicycles, cargo, scooters, or other equipment to be easy transported at the rear of the vehicle.

Embodiments of the present invention are directed to an instant release coupler and universal mount having main body which uses a trigger integrated therein. An adapter is configured to engage with the release coupler such that the trigger releases a latch for holding a coupler to the adapter. The adapter has a rounded male member allowing the base to engage within a cavity located within the release coupler. When the release coupler is connected to an automotive hitch, this allows for easy transport and release of heavy objects such as bicycles and other cargo.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

I claim:

1. A release coupler comprising:
    a base;
    a carry handle;
    a trigger; and
    wherein the trigger releases a latch for holding an attachment connected to the base and where one end of the base connects with an adapter having a male member with blunt rounded end for connection to a vehicular towing hitch and the opposite end of the base connects with an extension tube for holding an article for transport.

2. A release coupler as in claim 1, wherein a notch is configured at a top of the male member for aligning with the latch controlled by the trigger.

3. A release coupler as in claim 2, wherein the male member engages within a female cavity within the base.

4. A release coupler as in claim 1, wherein the article is a bicycle.

5. A release coupler for use in transporting articles by connecting to an automotive hitch comprising:
    a base having an aperture at a first end and second end;
    a carry handle having a trigger for controlling a latch; and
    wherein the first end is configured to accept an adapter having a male member with blunt rounded edge, connected to the automotive hitch, and the second end is configured to accept an extension tube for securely holding the articles such the latch operates to release the adapter from the base.

6. A release coupler as in claim 5, wherein the male member includes a notch at its top edge for engaging the latch.

7. A release coupler as in claim 5, wherein the blunt rounded edge fits within a female cavity configured at the first end of the base.

8. A release coupler as in claim 5, wherein the articles are at least one bicycle.

9. A release coupler for use in transporting an article of cargo using an automotive hitch comprising:
    a base having a first end and second end;
    a carry handle and a trigger connected to the base;
    a latch controlled by the trigger; and
    wherein the base is configured to attach an adapter, where the adapter includes a notch for engaging with the latch, at the first end of the base for connection with the automotive hitch.

10. A release coupler as in claim 9, wherein the second end of the base is used to attach an extension tube for carrying the article of cargo.

11. A release coupler as in claim 10, wherein the first end includes an opening in the base for inserting the adapter.

12. A release coupler as in claim 10, wherein the second end includes an opening in the base for inserting the extension tube.

13. A release coupler as in claim 12, wherein the latch engages within the notch such that the latch can either securely hold or release the adapter from the base.

14. A release coupler as in claim 9, wherein the base is a tubular body.

15. A release coupler as in claim 9, wherein the adapter includes a male member for engaging within a cavity located at the first end of base.

16. A release coupler as in claim 9, wherein the article of cargo is at least one bicycle.

\* \* \* \* \*